Nov. 25, 1924.
G. A. WATKINS
TESTING APPARATUS
Filed Jan. 15, 1921
1,517,037
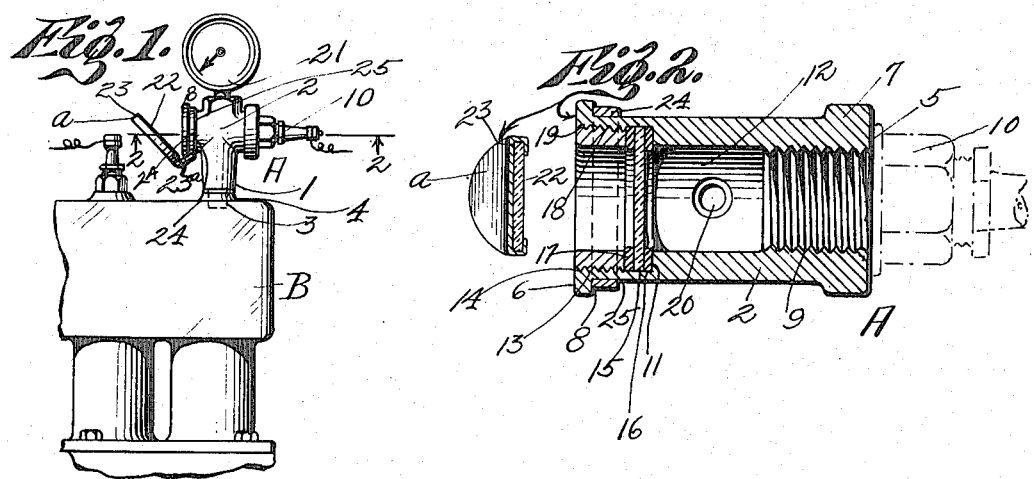
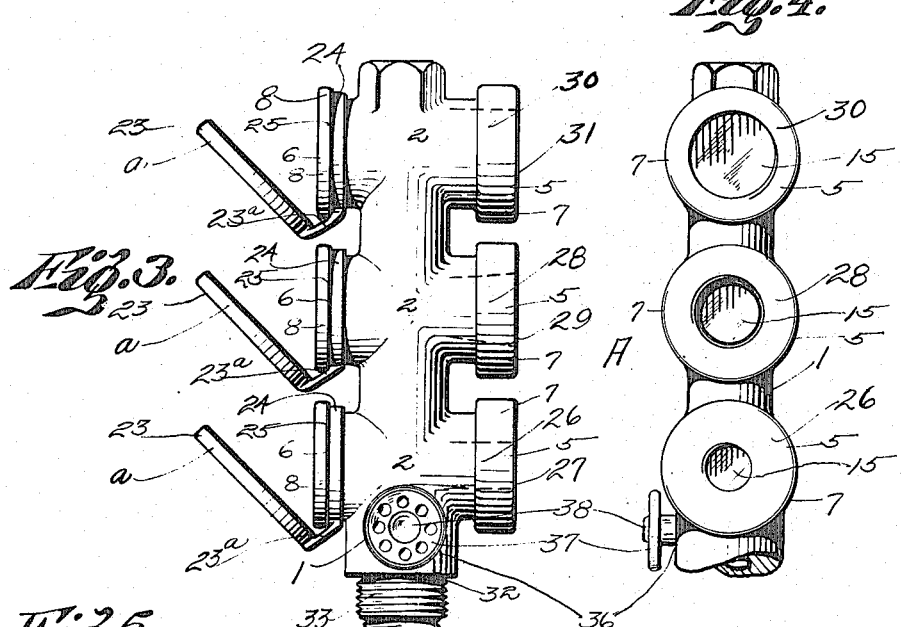
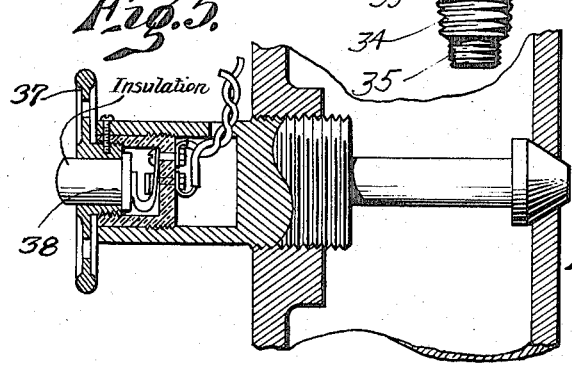
Inventor;
George A. Watkins
by Raymond␣␣Blakeslee
Atty.

Patented Nov. 25, 1924.

1,517,037

UNITED STATES PATENT OFFICE.

GEORGE A. WATKINS, OF LOS ANGELES, CALIFORNIA.

TESTING APPARATUS.

Application filed January 15, 1921. Serial No. 437,424.

*To all whom it may concern:*

Be it known that I, GEORGE A. WATKINS, a citizen of the United States, residing at Los Angeles, in the county of Los Angeles and State of California, have invented new and useful Improvements in Testing Apparatus, of which the following is a specification.

This invention relates to an improvement in testing apparatus, for determining the fault or trouble with electric ignition apparatus of internal combustion engines. The invention has for an object the provision of a device which may reliably test the several factors of the apparatus at both atmospheric, compression and other pressures.

In practicing the invention, I provide a tubing integrally formed with a tubular T-head. The end of the tubing is exteriorally screw-threaded, while both ends of the T-head are interiorally screw-threaded. The screw threads in one end of the T-head are for accommodation of the shank portion of a spark plug. The opposite end of the T-head is provided with an internal shoulder and a translucent member is held against said shoulder by means of a ring nut exteriorally threaded for engagement with the threaded portion of the T-head. If desired, the T-head may be provided with a threaded perforation extending through its wall, and in axial alignment with the tubular member, so that a compression or pressure gauge may be joined therewith to test the compressive pressure within the T-head. The end of the T-head which carries the translucent member likewise carries a reflecting medium ranging approximately at a forty-five degree angle to said T-head end. Said reflecting apparatus is capable of being rotated around said T-head so that the same may assume various positions. If the screw-threaded end of the tubular member were screwed into the spark plug opening of an internal combustion engine, and the spark plug removed from said opening, placed in the screw-threaded end of the T-head, it is obvious that if the engine was started the pressure within the tubular member and the T-head would be equal to the normal pressure under which the spark plug would be subjected in practice. This is a valuable adjunct, as the testing of a spark plug under atmospheric condition is not a reliable gauge, as the spark plug may spark in the atmosphere, but will not spark in connection with the cylinder when subjected to the compression of the gas as performed in the actual and practical usage of the same.

The main fault of the average tester for spark plugs is that the glass portion or translucent portion may at times be blown out or otherwise broken and endanger the observer's eyes. Another fault is that it is impossible to use said testing apparatus while the automobile is moving. However, the reflecting apparatus which is used in conjunction with the T-head overcomes this difficulty in that the driver of the automobile may adjust the reflecting apparatus at a suitable angle and watch the spark in said reflecting apparatus while at the same time driving the automobile. This enables the driver to determine which cylinder is weak in compression as well as the workability of the spark plugs under actual operating conditions.

It has been found that a light blue spark emitted at the spark plug terminals is most desirable. Consequently, in this apparatus the translucent member is made of a light blue color. Hence, when the engine is being turned over, or the engine running, all sparks discharged across the spark plug terminals will be reflected in the reflecting medium, but when the proper and most efficient spark, which, as stated, is light blue, is discharged across the spark plug terminals, instead of the spark being reflected in the reflecting medium, there will simply be a glow, due to the fact that the light blue color of the spark was absorbed by the translucent medium, all other colors being readily passed through said translucent medium.

The invention has for further objects the provision of an improved tester which will be superior in point of relative simplicity and inexpensiveness, taken in conjunction with utility, durability and general efficiency and serviceability.

With the above mentioned and other objects in view, the invention consists in the novel and useful provision, formation, construction, combination, association and inter-relation of parts, members and features, as illustrated in some of its embodiments in the accompanying drawing, described in the following detailed description and finally pointed out in claims.

In the drawing:

Figure 1 is a fragmentary elevation showing the improved tester in co-operation with the cylinder of an internal combustion engine;

Figure 2 is a fragmentary cross-sectional view taken on the line 2—2, Figure 1, and looking in the direction of the appended arrows;

Figure 3 is a side elevation of a modification of the tester shown in Figure 1; and Figure 4 is a fragmentary elevation of the tester shown in Figure 3, with the parts revolved ninety degrees clockwise in the plane of the paper from the showing in Figure 3.

Figure 5 is a fragmentary detail of a switch and compression member used in practicing one embodiment of the invention.

Corresponding parts in all the figures are designated by the same reference characters.

The improved tester illustrated in the drawing is designated in its entirety by A and in which 1 represents the tubular member and 2 the T-head. It will be noted that the tester A is used in co-operation with an internal combustion engine B and particularly is adapted to be applied to the spark plug opening 3 in said engine B. The tubular member 1, which may of course be at any angle to the portion 2, is provided at at its end, as 4, with external screw threads for engagement with the internal screw-threaded portion of the spark plug opening in the engine B. As stated, the tubular member 1 and the T-head 2 are integrally formed so that their chambered portions intercommunicate. The T-head 2 is formed at both ends, as 5 and 6, with an external flange 7 and 8. The interior portion ranging from the end 5 of the T-head, is screw-threaded as shown at 9, for accommodation of the shank portion of the spark plug 10. The opposite end 6 of the T-head is formed so as to provide an internal shoulder 11 within the chambered portion 12 of said T-head 2. This shoulder 11 may be formed by drilling out a portion as 13 of the T-head, ranging inwardly from the end 6, the circular cut-out portion 13 being of a larger diameter than the diameter of the chamber 12. The inner peripheral surface of the cut-out portion 13 is screw-threaded as shown at 14.

A translucent member 15 placed between washer members 16 and 17, is adapted to fit within the portion 13 so that the same may abut against the shoulder portion 11. It may be stated at this point, that the translucent member 15 may be formed of mica, glass, resistal (which is a combination of mica and glass), or any other translucent substance, and the translucent member 15 is preferably held between washer or ring members 16 and 17 formed of copper. It has been found that when the T-head is made of steel, and the washers made of copper, best results are obtained, as the expansibility of the two metals being different does not seem to effect the translucent member 15 or warp the same or break it. Many different forms of washers were used but until copper was substituted the device did not work entirely satisfactorily. There may be other theories as to why copper and steel together work best in conjunction with each other in a device of this character, but of which the inventor at this time is not fully aware.

In order to hold the washer members as well as the translucent member in place against the shoulder 11, a ring member 18, provided with external screw threads 19, has a screw-threaded engagement with the threads 14, in the portion 13 of the T-head 2. The T-head is likewise formed with a threaded perforation 20 extending into the chamber 12, and in axial alignment with the tubular member 1; the threaded perforation 20 is adapted to receive a gauge member 21 provided with a stem which is correspondingly screw-threaded, whereby the compressive pressure within the cylinder member of the engine B may be measured.

Referring to Figure 1, it will be observed that when the tester A is in position upon the engine B, it is possible to see the spark cross the terminals of the spark plug 10 by looking through the end 6 in the T-head 2. However, as pointed out in the first part of the specification, if there should happen to be an explosion within the chamber 12, the translucent member 15 might be blown outwardly and the particles thereof lodged in the observer's eye with resultant damage. To overcome this objection, and make the device fool-proof as well as safe, I provide a reflecting medium $a$ which may be detachably joined with the device A. Said reflecting medium $a$ includes a reflecting plate or mirror 22, suitably held within a frame member 23, which frame member in turn has joined therewith an arm 23[a] carrying a ring member 24 adapted to encircle a portion as 25 of the T-head 2 and be retained upon said T-head and prevented from loss therefrom by the flange portion 8. The ring member 24 frictionally engages the outer surface of the T-head 2, so that the ring member may be rotated and the reflecting medium or mirror 22 rotatably adjusted. Preferably, the mirror 22 is at a forty-five degree angle to the end 6 of the T-head 2. Consequently, an observer standing outward from the engine and looking into the mirror or reflecting plate 22 of the device $a$, may readily observe whether or not there is a spark across the terminals of the spark plug 10, when the engine is running, as each flash across the terminals of said spark plug will be made visible upon the mirror 22.

It is elementary that light travels in straight lines, when not affected by some medium, and consequently the light being reflected outward through the translucent medium 15 is reflected upon the mirror 22 and thence is reflected to the eye of the observer at the same angle with which the light ray impinged upon the mirror 22.

Hence it will be seen that the driver of the machine or person testing the spark plug may sit in the driver's seat and watch the condition of the spark across the spark plugs by simply adjusting the device a so that the spark is visible to him from the driver's seat. As above stated, the translucent medium 15 may be made in colors. It has been found that a light blue spark is most efficient and consequently by making the translucent medium 15 light blue in color, all other colors of sparks emitted across the terminals of the spark plug 10 will readily pass through the translucent medium 15 and be reflected upon the mirror 22. However, when the proper spark is obtained by proper adjustment, etc., the light ray given off by the terminals of the spark plug will be absorbed by the translucent medium 15 and only cause a glow to appear in the mirror 22. The person testing the spark plug will know that it is in proper condition when this occurs.

Obviously, any number of testers A may be provided, and there might be a tester for each spark plug opening in the engine B, so that the condition of all the spark plugs might be observed while the engine is running.

It is also obvious that the spark plug 10 will be working under the compression of the gas within the engine cylinders of the engine B. The modification of the tester A shown in Figures 3 and 4 is principally of use in garages and is made so that it may be readily adaptable to various size spark plugs and various size spark plug openings in the engine B. The T-head shown at 26 might have its end, as 27, internally threaded with standard threads, while the T-head shown at 28 might have its end, as 29, interiorally threaded with seven-eighths A. L. A. M. standard, while the T-head shown at 30 might have its end, as at 31, interiorally provided with metric threads. The construction otherwise is similar to the device illustrated in Figures 1 and 2, each one of the T-heads being provided with the reflecting device a.

However, the end, as 32, of the tubular member 1 is so formed as to have a series of threaded walls of different diameters conically arranged so as to be adaptable to fit in spark plug openings of an engine or engines having corresponding diameters as illustrated at 33, 34, and 35.

In place of having three diameters 33, 34 and 35, of the screw-threaded portions, or of having the T-heads 28 and 30, it might of course be possible to provide the T-head 26 with a bushing having an opening therethrough, whose threaded walls are of various diameters conically arranged in series and adapted to receive different size spark plugs, or to be fitted within the spark plug openings in an engine.

Either one of the devices as illustrated in Figures 1 and 2 or Figures 3 and 4, may be provided at an end, as 36 of the tubular member 1, with a compression release valve 37, which compression release valve is provided with an electric switch 38. The release valve 37 permits an atmospherization of the interior of the tubular member 1 when the same is turned in one direction or under conditions of compression when turned in an opposite direction to prevent the admittance of air within the tubular member. An ordinary electrical switch 37 is carried by the valve 37, which switch may be interposed in the circuit with the spark plug under test so that when the switch is closed the spark plug would be allowed to operate to flash a spark across the terminals thereof, thus permitting a testing of the spark plug at will of the operator under either atmospheric or compression conditions.

It is obvious that many changes and variations and modifications might be made in departure from the particular description and showing of the accompanying drawing, adapting the invention to various conditions and requirements of use and service, without departing from the true spirit of the invention.

What I claim and desire to secure by Letters Patent is:

1. A tester, including a tubular member, one end of the tubular member being formed with internal screw-threads, and adapted to receive the shank of a spark plug, and a translucent member closing the opposite end of the tubular member; there being means external the tubular member and at an angle to the end of the tubular member which carries the translucent member, whereby light emitted from the spark plug may be reflected; said translucent member being of a color corresponding to the color of the spark emitted by the spark plug when the spark plug is working most efficiently.

2. A tester, including a tubular member, one end of the tubular member being formed with internal screw-threads, and adapted to receive the shank of a spark plug, and a translucent member closing the opposite end of the tubular member; there being means external the tubular member and at an angle to the end of the tubular member which carries the translucent member, whereby light emitted from the spark plug may be reflected; said translucent member being bluish in color, whereby all colors of spark emitted by the spark plug will be transmitted to and reflected from the reflecting device until a spark corresponding to the color of the translucent member occurs, whereupon there will only be a glow, indicating correct operation of said spark plug.

3. A tester, including a tubular member, a portion of such tubular member being adapted to receive the shank of a spark plug, a visible member carried by the tubular member whereby sparks emitted by the spark plug within the tubular member may be observed; a valve for placing the interior of such tubular member either under atmospheric conditions or conditions of compression when such tubular member is received in the spark plug opening of an internal combustion motor, and an electrical switch adapted to be associated with the spark plug whereby the spark plug may flash an electrical spark when the switch is operated.

In testimony whereof, I have signed my name to this specification in the presence of two subscribing witnesses.

GEORGE A. WATKINS.

Witnesses:
 WM. A. WATKINS,
 GEORGE MAROGRENN.